No. 872,892. PATENTED DEC. 3, 1907.
F. E. BOWERS.
SPARE TIRE HOLDER.
APPLICATION FILED OCT. 26, 1906.
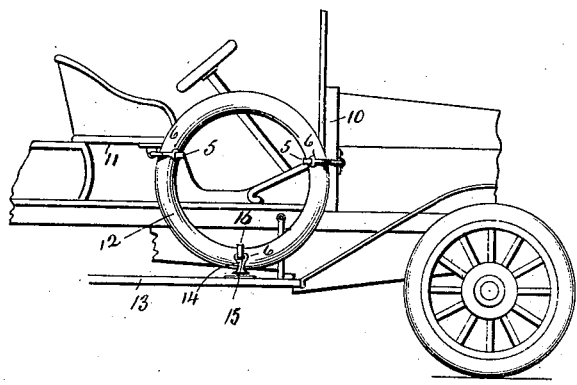
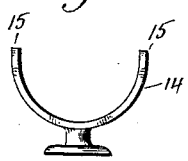
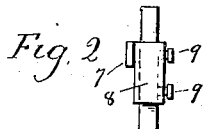
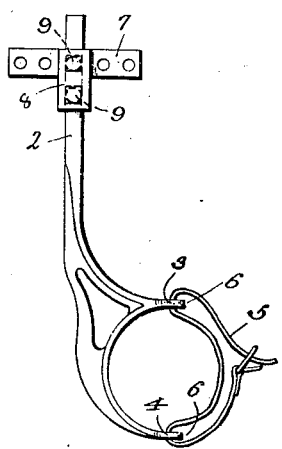
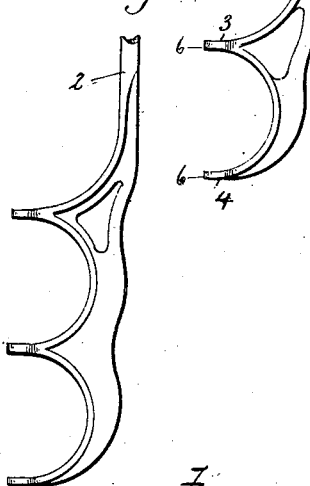

UNITED STATES PATENT OFFICE.

FREDSON E. BOWERS, OF NEW HAVEN, CONNECTICUT.

SPARE-TIRE HOLDER.

No. 872,892.     Specification of Letters Patent.     Patented Dec. 3, 1907.

Application filed October 26, 1906. Serial No. 340,709.

*To all whom it may concern:*

Be it known that I, FREDSON E. BOWERS, a citizen of the United States, residing at New Haven, in the county of New Haven and State of Connecticut, have invented a new and useful Improvement in Spare-Tire Holders; and I do hereby declare the following, when taken in connection with the accompanying drawings and the letters of reference marked thereon, to be a full, clear, and exact description of the same, and which said drawings constitute part of this specification, and represent, in—

Figure 1 a side view of a portion of a motor vehicle showing my improved spare tire holders applied thereto. Fig. 2 a top or plan view of one of the holders showing the socket as turned for attachment to the dashboard. Fig. 3 a similar view of another holder showing the socket in position for attachment to the seat flange. Fig. 4 a side view of a clip adapted to be attached to the running-board. Fig. 5 an edge view of the same. Fig. 6 a plan view of the outer end of the arm adapted to hold two tires.

This invention relates to an improvement in spare tire-holders, that is, devices for supporting or attaching spare motor wheel tires to a motor vehicle. These spare tires have been attached to motor vehicles in various ways, but preferably they are carried in a vertical position at one side of the vehicle.

The object of this invention is to provide forked arms to which the tire may be strapped so as to be firmly held and which will not be unsightly, and which may be conveniently attached to motor vehicles of ordinary construction; and the invention consists in the construction as hereinafter described and particularly recited in the claims.

In carrying out my invention, I provide means for attaching the tire at three points, and it is the means of attachment at two of these points to which I will more specifically refer, and each of which comprises a straight shank 2 preferably round in cross-section and formed at its outer end with fingers 3, 4 forming a semicircular yoke to receive the tire which is secured therein by straps 5 passing through eyes 6 in the ends of the fingers. The socket is of T-shape comprising a plate 7 by which it may be attached to the vehicle, and a tubular portion 8 through which the shank 2 extends and in which it is longitudinally and rotatably adjustable and in which it may be clamped by set screws 9. The socket for one of these arms may be attached to the dashboard 10 or other suitable point forward of the seat, while a second socket may be secured to the under face of the outwardly extending flange 11 of the seat. Into each of these sockets one of the arms is passed and clamped therein by the set screws, the arms opening toward each other and turned at the proper angle to receive the tire 12 which is secured in place by the straps 5. As the construction of machines differs the length of the arms 2 will vary according to circumstances, so I prefer to construct them as long as can possibly be required, it being a simple matter to cut them off to the required length. A tire thus adjusted stands over the running-board 13, and to attach the tire thereto I provide a U-shaped clip 14 which is secured to the upper face of the running-board and formed with eyes 15 for the attachment of a securing strap 16 like the straps 5. A tire can thus be conveniently carried, and as the arms are at a point above the center of the tire, it follows that it will be securely held in place, and the arms may be of desired design to give an attractive appearance. In some cases two spare tires are carried, and if so, the arms may be formed with two sets of fingers as shown in Fig. 6, it being understood that in such case two clips or a double clip will be secured to the running-board.

I claim:—

The herein described spare tire holder comprising a straight shank, two fingers projecting from one side thereof at substantially right angles thereto, a strap engaged with said fingers, a socket in which the inner end of the shank is longitudinally and rotatably adjustable, and means for securing said shank in the socket, substantially as described.

In testimony whereof, I have signed this specification in the presence of two subscribing witnesses.

FREDSON E. BOWERS.

Witnesses:
   FREDERIC C. EARLE,
   CLARA L. WEED.